United States Patent
Gramain

[15] 3,690,701
[45] Sept. 12, 1972

[54] SLEEVE FOR CONNECTING PIPES
[72] Inventor: Jean Gramain, Paris, France
[73] Assignee: Pneumatiques, Caoutchouc Manufacture et Plastiques Kleher Colombes, Colombes, France
[22] Filed: Sept. 29, 1970
[21] Appl. No.: 59,258

[30] Foreign Application Priority Data
July 31, 1969 France.................6926434

[52] U.S. Cl..................................285/111, 285/345
[51] Int. Cl................................................F16i 17/00
[58] Field of Search......285/111, 112, 379, 369, 345; 277/189, 205

[56] References Cited
UNITED STATES PATENTS

| 3,400,954 | 9/1968 | Brown | 277/205 X |
| 682,873 | 9/1901 | Joy | 285/379 |
| 3,127,196 | 3/1964 | Fabian, Jr. et al. | 285/111 |

FOREIGN PATENTS OR APPLICATIONS

| 171,511 | 11/1921 | Great Britain | 285/111 |
| 439,890 | 12/1967 | Switzerland | 285/111 |

Primary Examiner—Andrew V. Kundrat
Attorney—Holcombe, Wetherill & Brisebois

[57] ABSTRACT

In a connecting sleeve fitting around adjacent ends of two aligned pipes and comprising at each end a resilient axially extending fluid tight sealing member gripped between the sleeve and the pipes, the sleeve has near each end circumferentially distributed apertures into which fit projections extending radially from a flange on the external surface of the sealing member.

3 Claims, 8 Drawing Figures

PATENTED SEP 12 1972

SLEEVE FOR CONNECTING PIPES

The present invention relates to a sleeve for connecting end-to-end two aligned pipes. An object of the invention is to simplify the manufacture of the sleeve and its assembly on the pipes and to provide a good fluid-tight seal even in the case of relatively high pressure fluid flowing through the pipes.

The invention relates more particularly to the kind of connecting sleeve having a diameter larger than the diameter of the pipes to be connected together and comprising in the vicinity of each end a resilient fluid-tight sealing member gripped between the internal surface of the sleeve and the corresponding external surface of the pipe. According to the invention a connecting sleeve of the kind described has in the vicinity of each end a series of circumferentially distributed apertures, and each sealing member comprises a body extending axially between the surfaces of the sleeve and the pipes, this body being terminated internally by fluid-tight lips and externally by a flange from which extend radial projections which adjust themselves in said apertures so as to hold the member stationary in the axial and rotational directions.

By way of example various forms of embodiment of the invention are now described with reference to the accompanying drawings in which.

Figure 1:
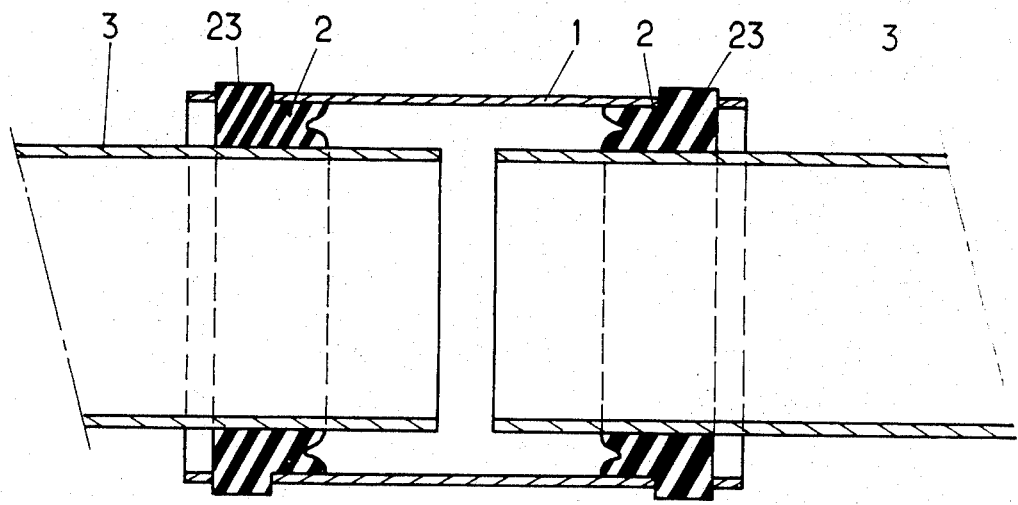
FIG. 1 is a view in sectional elevation of a connecting sleeve mounted on two pipe elements placed end-to-end.
Figures 2, 3:
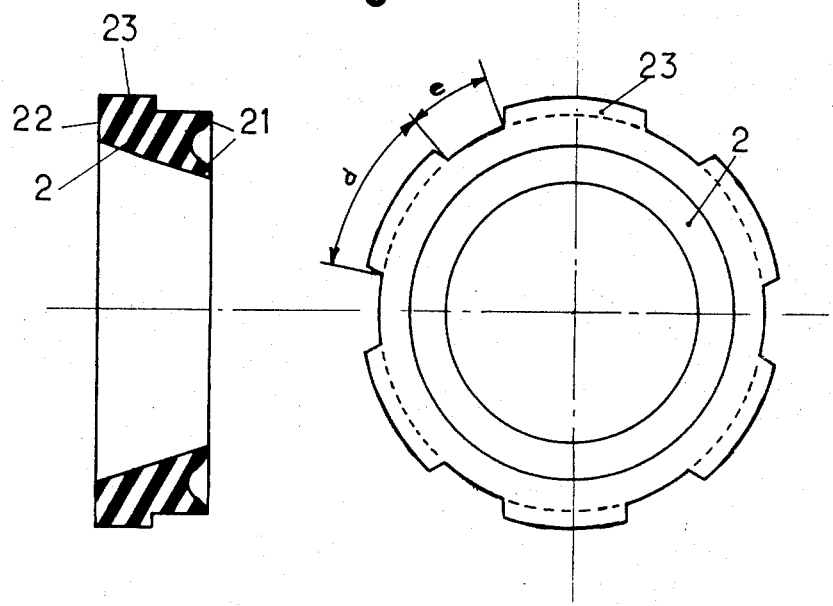
FIGS. 2 and 3 are sectional and front views respectively of one of the fluid-tight joints of this sleeve.

In FIGS. 1 to 3 a connecting sleeve comprises a cylindrical rigid sleeve proper referred to as 1, and two resilient fluid-tight sealing members 2 gripped between the internal surface of the sleeve 1 and the corresponding external surfaces of the pipes 3. The members 2 each comprise a body extending axially between the sleeve and the pipes, this body being terminated internally by fluid-tight lips 21 and externally by a flange 22. Extending from this flange are radial projections 23 distributed circumferentially and giving to the joint a crenellated form (FIG. 3). These projections may be of circular or polygonal section. They penetrate into the corresponding apertures provided in the vicinity of each end of the sleeve 1 so as to hold the members 2 stationary in the axial and rotational directions. The projections 23 preferably have a radial height greater than the thickness of the sleeve 1 in order to ensure a good anchorage on the sleeves.

Furthermore they extend circumferentially over a distance $d$ which may be equal to but preferably is greater than the distance $e$ between adjacent projections 23.

With this form of sleeve it is possible to obtain a good fluid-tight seal even at relatively high pressures, for example 30 bars, due to the combined effect of the fluid-tight lips 21, the radial gripping of the sealing members 2 by the sleeve, and the firm anchorage of the members 2 by the radial projections 23 thus permitting the members 2 to resist any relative axial movement.

Moreover, the form of the members 2 with their projections 23 located towards the exterior permits angular misalignment of the pipes without loss of fluid-tightness.

Figure 4:
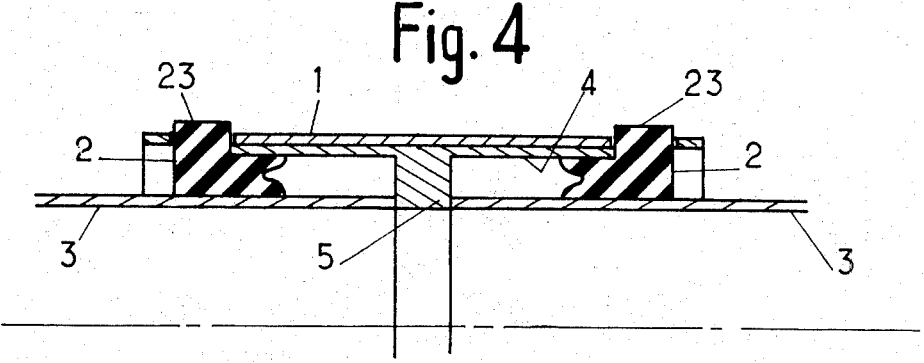
FIGS. 4, 5 and 6 are views in part elevational section of other forms of embodiment of the invention.

In FIG. 4 the sleeve 1 comprises an internal tubular element 4 axially centered between the members 2 and having a central internal projection 5 of internal diameter corresponding approximately to the internal diameter of the pipe 3. This central projection 5 ensures the positioning of the sleeve in relation to the pipes by limiting the penetration of the pipes into the sleeve during assembly. The element 4 may be rigid or flexible, and preferably it is inserted at its ends between the lips of the members 2 and the sleeve. The element 4 may be rigid with the sleeve 1.

Figure 5:
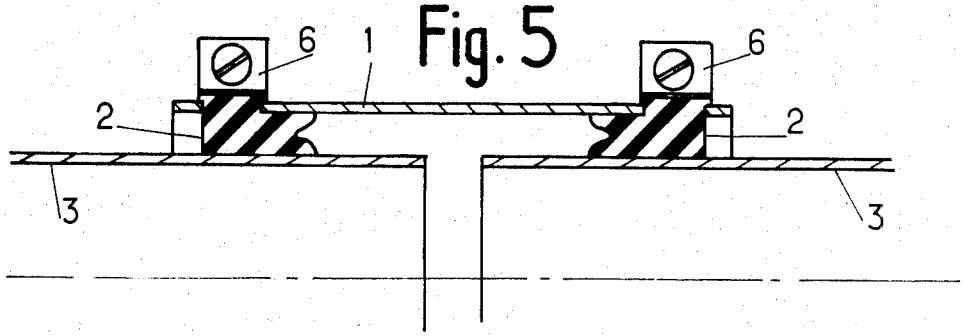

In FIG. 5 the connecting sleeve is completed by gripping collars 6 placed around radial projections 23. The gripping of these collars causes opening out of the part extending beyond the projections 23 thereby facilitating the anchorage and consequently resistance to pressure of the members 2.

Figure 6:
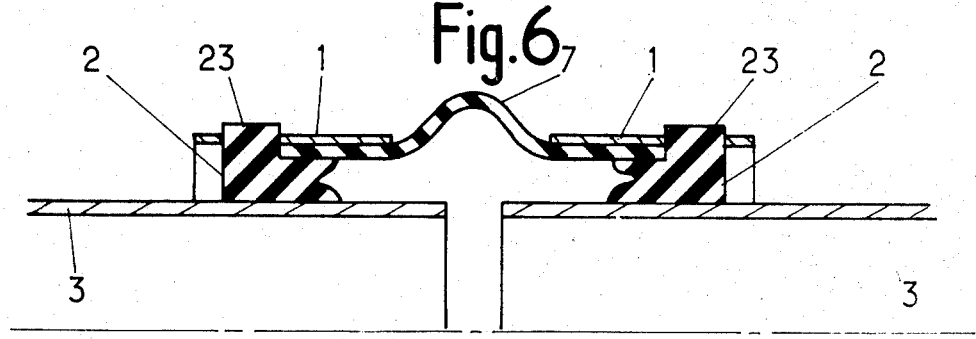

In FIG. 6 the central part of the sleeve 1 is replaced by an expansion sleeve 7, which may be for example of rubber, and which may if desired comprise flexible reinforcement. This sleeve 7 may be extended by cylindrical parts engaged in the sleeve 1 and inserted in part between this sleeve and the lips of the members 2. They may also be cemented or otherwise caused to adhere to the interior of the sleeve 1.

Figure 7:
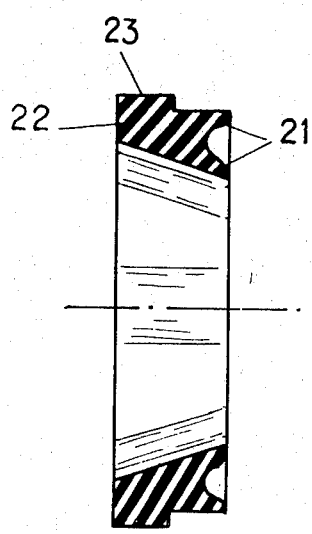
FIGS. 7 and 8 are sectional and front views of another form of fluid-tight joint.
Figure 8:
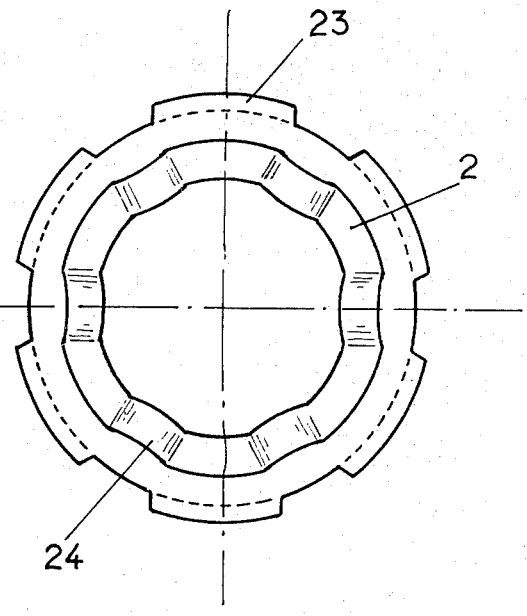

FIGS. 7 and 8 show another form of sealing member 2 which can be used with the connecting sleeves previously described. The inner surface of this member 2 presents when at rest slight bulges of material 24 in the zones corresponding to the spaces provided between the radial projections 23. These bulges are progressively connected towards the internal surface of revolution of the sealing member. They permit, when the sleeve is assembled, a slight over-compression of the corresponding zones of the members 2 between the cylindrical surfaces of the pipe and the sleeve, thereby assisting fluid-tightness and resistance to pressure, even when the sleeve is used with gripping collars 6 as in the embodiment of FIG. 5.

I claim:

1. Connecting sleeve for pipes comprising in the vicinity of each end a resilient fluid-tight sealing member gripped between the internal surface of the sleeve and the external surface of a pipe, the sleeve having edges in the vicinity of each of its ends defining a series of circumferentially distributed apertures, and each sealing member comprising a body having an internal surface and an external surface and extending axially between the surface of the sleeve and a pipe, said body having fluid-tight lips adapted to cooperate with the sleeve and a pipe and a flange from which radial projections are adapted to extend in said apertures so as to hold the sealing member stationary in the axial and rotational directions, wherein the internal surface of the sealing member presents when at rest bulges in zones which correspond to spaces between the radial projections.

2. Connecting sleeve for pipes comprising in the vicinity of each end a resilient fluid-tight sealing member gripped between the internal surface of the sleeve and the external surface of a pipe, the sleeve having edges in the vicinity of each of its ends defining a series of circumferentially distributed apertures, and each sealing member comprising a body having an internal surface and an external surface and extending axially between the surface of the sleeve and a pipe, said body having fluid-tight lips adapted to cooperate with the sleeve and a pipe and a flange from which radial projections are adapted to extend in said apertures so as to hold the sealing member stationary in the axial and rotational directions, wherein the radial projections each have a radial height greater than the thickness of the sleeve so as to extend beyond the external surface of said sleeve and wherein collars are provided for gripping the parts extending beyond the radial projections.

3. Connecting sleeve for pipes comprising in the vicinity of each end a resilient fluid-tight sealing member gripped between the internal surface of the sleeve and the external surface of a pipe, the sleeve having edges in the vicinity of each of its ends defining a series of circumferentially distributed apertures, and each sealing member comprising a body having an internal surface and an external surface and extending axially between the surface of the sleeve and a pipe, said body having fluid-tight lips adapted to cooperate with the sleeve and a pipe and a flange from which radial projections are adapted to extend in said apertures so as to hold the sealing member stationary in the axial and rotational directions wherein the central part of the sleeve is an expansion sleeve.

* * * * *